United States Patent [19]

Johnston

[11] Patent Number: 4,993,755
[45] Date of Patent: Feb. 19, 1991

[54] QUICK CONNECT FITTING

[75] Inventor: Robert L. Johnston, Greenville, Ohio

[73] Assignee: Master Industries, Inc., Ansonia, Ohio

[21] Appl. No.: 410,918

[22] Filed: Sep. 22, 1989

[51] Int. Cl.$^5$ .............................................. F16L 37/18
[52] U.S. Cl. ...................................... 285/315; 285/92; 285/322; 285/340; 285/422
[58] Field of Search .............. 285/315, 314, 359, 340, 285/319, 92, 322, 422

[56] References Cited

U.S. PATENT DOCUMENTS

| 2,784,987 | 3/1957 | Corcoran | 385/319 X |
| 4,275,907 | 6/1981 | Hunt | 285/319 X |
| 4,664,427 | 5/1987 | Johnston | 285/340 |
| 4,712,810 | 12/1987 | Pozzi | 285/315 X |
| 4,743,051 | 5/1988 | Proni | 285/319 |

Primary Examiner—Dave W. Arola
Attorney, Agent, or Firm—Barnes, Kisselle, Raisch, Choate, Whittemore & Hulbert

[57] ABSTRACT

A quick connect fitting in which tubing can be inserted into a pre-assembled fitting where it will become sealed and locked against pull-out. A main fitting body has an open-ended recess in which is located a movable piston to seal against the body and an inserted tube. The piston wedges over a conical extension on a sealing gland retained by a screw-on cap. The sealing gland has rearward, circumferentially spaced fingers radially movable. An axially shiftable ring, in one position, allows the fingers to expand to receive the tube, and, when shifted to a second position, moves the finger to engage the extension surface of the tube to lock against withdrawal.

6 Claims, 2 Drawing Sheets

QUICK CONNECT FITTING

FIELD OF THE INVENTION

Connections for tubing wherein the end of a tubing may be pushed into a threaded connector fitting and securely retained against withdrawal, thus facilitating a quick connection for tubing into a position of utility for pneumatic or hydraulic systems.

BACKGROUND AND FEATURES OF THE INVENTION

There are many uses for pneumatic or hydraulic tubing in machine tools, automotive vehicles and numerous other applications. In many installations, it is desirable to be able to connect the tubing quickly and effectively. When it is necessary to use wrenches or other tools to make the connections, much time is lost and tight joints may not always result unless the involved workman is acting with skill and care.

In the installation of the tubing in assembly lines, such as tubing for automotive transmissions, cooling systems and heaters, speed of installation and quality is essential. It is an object of the present invention to provide a connector fitting assembly into which the end of tubing can be inserted and pushed in where it will instantly be held against withdrawal and sealed against leakage.

A further object is the provision of a tube fitting which will allow tube rotation and a limited angular movement without disturbing the seal and also a structure which will seal more tightly as pressure increases.

It is further object to provide a tube fitting for push-in connection which can be released by proper manipulation of one of the elements without damage to the tubing.

One patent directed to the objects of the invention is Robert L. Johnston U.S. Pat. No. 4,664,427, issued May 12, 1987, and having an assignee common to the present application. The invention to be described constitutes an improved structure over that disclosed in the cited patent in the form of a modified seal arrangement and retainer cap, an improved seal holder, and a secondary or redundant lock assembly which cooperates with the seal holder.

Other objects of the invention will be apparent in the following description and claims in which the invention is described together with details to enable persons skilled in the art to practice the invention, all in connection with the best mode presently contemplated for the practice of the invention.

BRIEF DESCRIPTION OF THE DRAWINGS

DRAWINGS accompany the disclosure and the various views thereof may be briefly described as.

DETAILED DESCRIPTION OF THE INVENTION AND THE MANNER AND PROCESS OF USING IT

Figure 3:
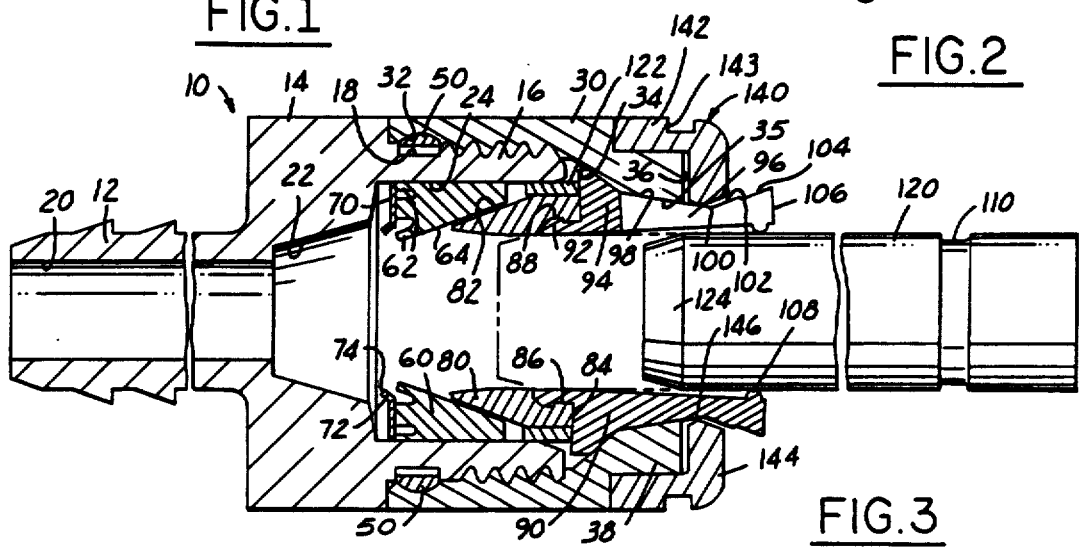
FIG. 3, a sectional view on line 3—3 of FIG. 2 showing the connector in unlocked position.

With reference to the drawings, the respective figures show a screw machine body part 10 formed, for example, of a marine aluminum, with a hose fitting 12 at one end of a cylindrical body 14, and a threaded extension 16 at the other end ensmalled in diameter from the body 14. A groove 18 is preferably formed at the base of the threads in extension 16. The body 10 has an axial passage 20 extending through the fitting 12, enlarging in a tapered section 22, and then into a cylindrical section 24 (FIG. 3).

Threaded on the extension 16 is a hollow retainer cap 30, also preferably formed of aluminum, and this can also be a screw machine part with a cylindrical portion internally threaded having an internal annular groove 32 at the outer end of the threads. The threaded section tapers down at 34 at about a 41° angle and then flares outwardly at 35 at about 10° to the axis to the axial end 36 of an ensmalled section 38. The outer periphery of retainer cap 30 has a configuration to facilitate turning.

A split lock ring 50 in groove 18 of cap 30 underlies groove 32 of threaded extension 16 so that when the parts are threaded together, a seal and lock is formed. The material for the ring 50 is a plastic identified in the field as ULTEM (Trademark) and the outer cross-section is preferably arcuate. The material ULTEM is a high temperature polyetheramid plastic.

Within the cylindrical section 24 of body part 10 is a seal ring 60 which can be characterized as a piston, with a cylindrical outer diameter and a double-lip seal 62 at one end. The inner diameter tapers outwardly at 64 at an angle of about 20°. This ring piston 60 is preferably formed of Teflon (Trademark). The parts thus far described may be formed of metal such as aluminum but also of molded or machined plastic.

Abutting the double seal end of ring 64 is a locking ring 70 formed of relatively hard stainless steel and with an outturned portion 72 having a sharp corner 74, the function of which will be described later.

Next to be described is a two-part assembly to cooperate with the seal ring piston 60. The first part is a projectible nose ring tube seal 80 which has a tapered nose portion 82 angled to correspond essentially to the angle of the tapered surface 64 on part 60. The rear portion of ring 80 is cylindrical terminating in a shoulder 84 and having an annular internal recess 86 with an undercut 88. The second part of this assembly is a push ring 90, the forward end of which has an annular projection 92 with a ridge to enter the re-entrant undercut groove 88. The two parts 80 and 90 are thus engaged for fore and aft movement. To the rear of the forward portion 92 of part 90 is an enlarged ring portion 94 with a forward radial shoulder and a rearward tapered outer surface to engage the taper 34 on the retainer cap 30. Behind the enlarged ring 94 are circumferentially spaced fingers 96 (FIG. 2) tapered at 98 to cooperate with tapered surface 35 of retainer cap 30. The tapered section 98 reaches the smallest diameter 100 and then tapers outwardly at 102, ensmalls slightly at a shoulder, and then enlarges at 104 to the outer end 106. Internally of the tapered portion 104 is an inwardly extending ridge 108 on the fingers 96 which will engage a groove 110 in a tube 120 when moved into the connector. A back-up ring 122 formed of ULTEM (Trademark) is interposed between part 80 and the cylindrical section 24 of the passage in body 10. The rearward end of ring 122 abuts against the radial shoulder of the ring portion 94. As previously indicated, the described parts may be formed of metal or a properly selected plastic.

One remaining part of the assembly is next to be described. It is a cap lock 140 in the form of a circumferential ring 142 with an outer groove 143 and an inturned flange 144. The flange 144 has an inner diameter surface shaped by opposed tapers to a relatively sharp annular ridge 146. This part may also be formed of aluminum or plastic.

Figure 5:
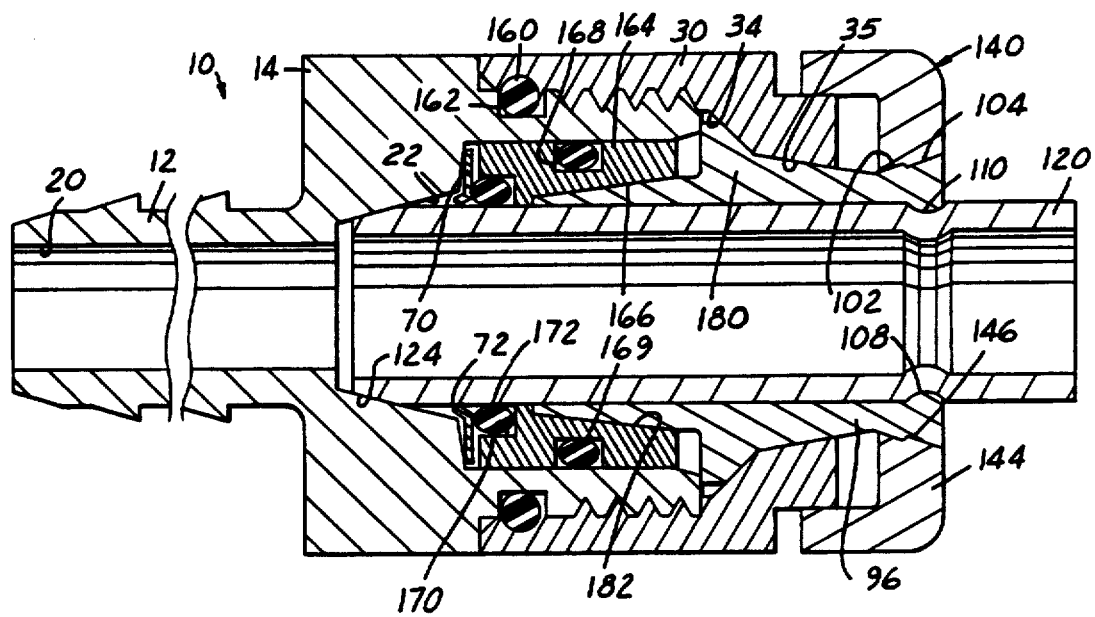
FIG. 5, a sectional view similar to FIG. 4 illustrating modified seals.
Figure 6:
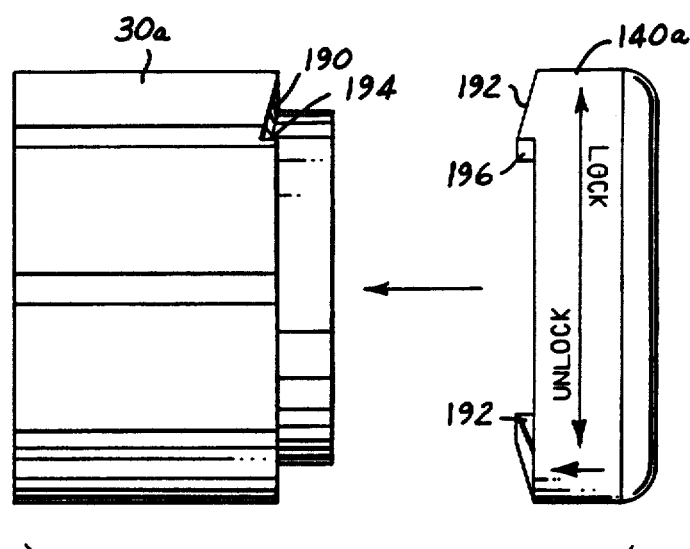
FIG 6, a detailed view of a retention cap and cap lock.

In FIG. 6, details of parts 30 and 140 of FIG. 5 are shown as parts 30a and 140a. A thread cam arrangement is provided between the cap 30a and the cap lock 140a so that a twist of 45° clockwise moves the retainer part 140a outward into locking position as shown in FIG. 5. To unlock, the cap lock 140a is twisted counterclockwise while pushing in the cap, and the retainer stops 194, 196 increase the pressure to unlock the retainer cap 140a and place it in the release position as shown in FIG. 1.

THE OPERATION

Figures 1, 2:
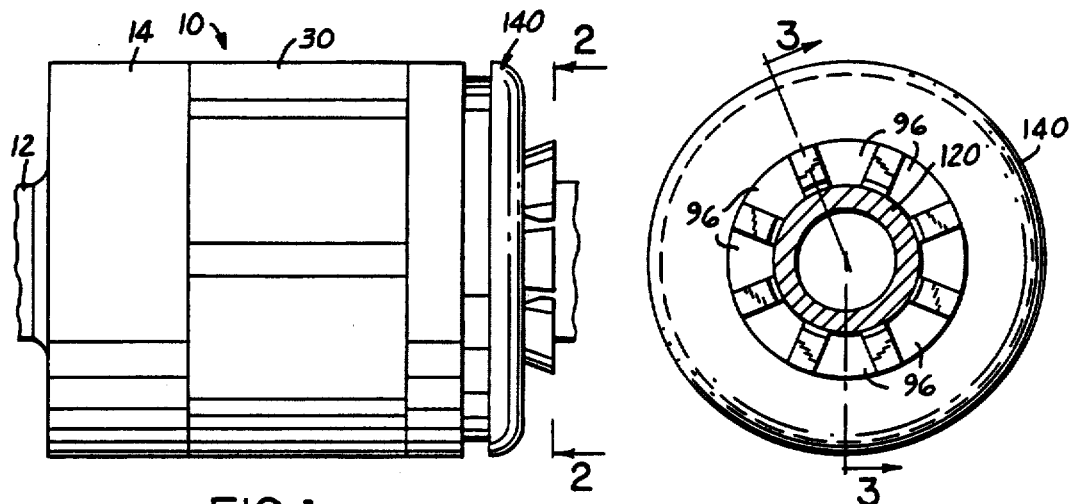
FIG. 1, an outside elevation of the assembled connector fitting.
FIG. 2, an end view of the structure on line 2—2 of FIG. 1.

As the parts are shown in FIG. 1, the connector is an in a position to receive the tube 120 which has an end taper 124. This taper will cam outwardly the flexible fingers 96 acting on the ridges 108. The tube 120 is pushed into the assembly until the ridges 108 engage the groove 110 in the tube. At this point, the sharp inner edge 74 of ring 70 engages the tube surface and, since the tube is a relatively soft material, the engagement prevents ready withdrawal. At this point, also, the double lip seal 62 acts to seal around the tube. In addition, the tube seal ring 80 seals against the surface of the tube.

Figure 4:
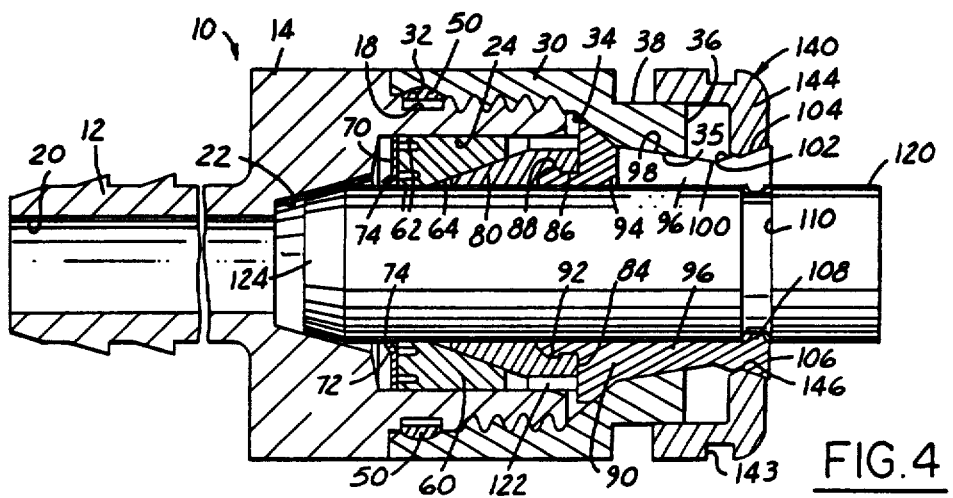
FIG. 4, a sectional view similar to FIG. 3 showing the connector in locked position.

Once the tube 120 is fully inserted, the lock ring 140 is pulled back manually and the ridge 146 engages the small shoulder between tapers 102 and 104 as shown in FIG. 4. Thus, the finger projections 96 are locked into the tube groove 110.

FIG. 5 is a sectional view similar to that in FIG. 4 showing modified seal designs for higher pressures. Similar parts have similar reference characters. While Teflon may be a suitable seal for some installations for seals 50 and 62 in FIG. 4, this may have a tendency to cold flow under certain pressures. In FIG. 5, an O-ring 160 in a suitable annular recess 162 serves to seal the threaded joint between parts 14 and 30. Also, ring piston 164 with the inner taper 166 has an O-ring groove 168 in the outer cylindrical surface for an O-ring 169, and an inner annular end groove 170 for an O-ring 172 which will bear against the locking ring 70. With the ue of the O-rings, the cpa 30 will stay in place in operational circumstances. However, it can be removed with the fingers without the need of any tools.

The ring 180 has a forward outer taper to cooperate with taper 166 and a rearward extension like that in FIGS. 3 and 4. The O-rings are preferably formed of a high temperature methanol synthetic rubber but any type of suitable material for O-rings can be used in FIG. 5.

The operation of the embodiment of FIG. 5 is similar to that described in connection with FIGS. 3 and 4. With ring 140 in a forward position, as in FIG. 2, the conduit 120 is projected into the opening in part 180. In this forward position, the fingers 96 can expand to receive the conduit. The tapered end 124 is moved into contact with taper 22 in the body 14. Threading part 30 onto body 14 has moved part 180 by reason of taper 34 into sealing relation with O-ring carrier 164. With the parts in the condition shown in FIG. 5, the ring 140 is shifted rearwardly to move the fingers 96 inwardly and cause the projections 108 to enter the groove 110 in the conduit 120. Taper 104 locks over the crest 146 and the seal is fully established.

What is claimed is:

1. A quick connect fitting assembly into which a tube can be pushed and locked and sealed comprising:
  (a) main fitting body having a utility hose connection means at one end and an open-ended cylindrical recess at the other end,
  (b) a sleeve piston in said recess having sealing means thereon designed to have a sealing relation with said recess and an internal sealing relation with an inserted tube, said piston having an internal conical recess facing the open end of said cylindrical recess,
  (c) a locking sleeve in said recess in axial alignment with said piston and having an external conical portion arranged and disposed to penetrate into said internal conical recess of said piston, said external conical portion having an inner sealing surface thereon, said external conical portion of said locking sleeve in assembly forcing said sleeve piston outwardly against the wall of said cylindrical recess and said inner sealing surface being forced inwardly into sealing relation with the exterior wall of said tube when said external conical portion of said locking sleeve is moved into the internal conical recess of said piston,
  (d) retainer means engageable with said main fitting body having an internal surface engageable with said locking sleeve wherein said retainer means can force said locking sleeve into said piston,
  (e) said locking sleeve having rearwardly extending circumferentially-spaced flexible fingers to engage the exterior of an inserted tube, and
  (f) a cap lock axially movable relative to said flexible fingers of said locking sleeve to a first position where said flexible fingers may expand radially by the introduction of the tube to allow tube insertion and movable to a second position to move said fingers radially into engagement with the inserted tube.

2. A quick connect fitting assembly as defined in claim 1 in which means on said cap lock and means on said locking fingers are engageable in the second position of said cap lock to retain said cap lock against displacement from said second position.

3. A quick connect fitting assembly as defined in claim 2 in which said means comprises an annular opening on said cap lock surrounding said fingers, and an annular concave area on said fingers encircled by said cap lock having a small diameter to allow radial expansion of said fingers in the first position and a larger diameter to engage the annular opening to restrain expansion of said fingers.

4. A quick connect fitting assembly as defined in claim 3 in which said larger diameter portion has an annular ridge engageable with an annular recess in said cap lock to block axial motion of said cap lock from said second position.

5. A quick connect fitting assembly as defined in claim 4 in which registering cam surfaces are provided on said retainer means and said cap lock whereby a twisting of said cap lock in one direction cams the cap lock outwardly to the second locking position, and twisting said cap lock in the opposite direction with axial pressure moves said cap lock into the first release position.

6. A fitting as defined in claim 5 in which axial stops on said cam surfaces of said retainer means and on said cap lock cooperate to facilitate axial pressure on said cap lock to move to a release position.

* * * * *

UNITED STATES PATENT AND TRADEMARK OFFICE
CERTIFICATE OF CORRECTION

PATENT NO. : 4,993,755

DATED : February 19, 1991

INVENTOR(S) : Robert L. Johnston

It is certified that error appears in the above—identified patent and that said Letters Patent is hereby corrected as shown below:

Col. 4, Line 65, change "claim 4" to -- claim 1 --.

Signed and Sealed this

Seventh Day of July, 1992

Attest:

DOUGLAS B. COMER

*Attesting Officer*    Acting Commissioner of Patents and Trademarks